United States Patent [19]
Fangmann et al.

[11] Patent Number: 5,611,016
[45] Date of Patent: Mar. 11, 1997

[54] DISPERSION-BALANCED OPTICAL CABLE

[75] Inventors: Robert E. Fangmann, Lilburn; Arthur F. Judy; James J. Refi, both of Atlanta, all of Ga.

[73] Assignee: Lucent Technologies Inc., Murray Hill, N.J.

[21] Appl. No.: 660,639

[22] Filed: Jun. 7, 1996

[51] Int. Cl.$^6$ .............................................. G02B 6/44
[52] U.S. Cl. ............................................................ 385/100
[58] Field of Search ........................ 385/100–113, 147, 385/27, 28, 123, 128, 24, 31; 359/115, 124, 127, 161, 173, 188, 900; 372/26

[56] References Cited

U.S. PATENT DOCUMENTS

| | | | |
|---|---|---|---|
| 4,261,639 | 4/1981 | Kogelnik et al. | 385/27 |
| 4,844,575 | 7/1989 | Kinard et al. | 174/110 R |
| 4,900,126 | 2/1990 | Jackson et al. | 385/100 |
| 4,918,751 | 4/1990 | Pessot et al. | 359/173 |
| 4,969,710 | 11/1990 | Tick et al. | 252/582 |
| 5,191,631 | 3/1993 | Rosenberg | 385/123 |
| 5,224,183 | 6/1993 | Dugan et al. | 385/24 |
| 5,327,516 | 7/1994 | Chraplyvy et al. | 385/123 |
| 5,343,322 | 8/1994 | Pirio et al. | 385/28 X |
| 5,361,319 | 11/1994 | Antos et al. | 385/123 |
| 5,373,382 | 12/1994 | Pirio et al. | 385/27 X |
| 5,400,165 | 3/1995 | Gnauck et al. | 385/122 X |
| 5,430,822 | 7/1995 | Shigematsu et al. | 385/123 |
| 5,434,879 | 7/1995 | Brun et al. | 372/50 |
| 5,448,674 | 9/1995 | Vengsarkar et al. | 385/123 |
| 5,473,719 | 12/1995 | Stone | 385/24 |
| 5,481,639 | 1/1996 | Cobb et al. | 385/135 |
| 5,504,829 | 4/1996 | Evans et al. | 385/123 |
| 5,532,868 | 7/1996 | Gnauck et al. | 385/24 |

OTHER PUBLICATIONS

Mettler, et al., "Optical Fiber Splicing", *Optical Fiber Telecommunications II*, pp. 263–300, (Miller, et al. eds, 1988).

Bhagavatula, et al., "Segmented–Core Single–Mode Fibres With Low Loss And Low Dispersion", *Electronics Letters*, 1983, vol. 19, pp. 317–318.

*Primary Examiner*—Akm E. Ullah
*Attorney, Agent, or Firm*—Michael A. Morra

[57] ABSTRACT

A dispersion-balanced optical cable 90 reduces four-photon mixing in Wave Division Multiplexing (WDM) systems and is effective to reduce cumulative dispersion D substantially to zero. The dispersion-balanced optical cable 90 includes one or more optical fibers 90-1 having positive dispersion $D_1$, and one or more optical fibers 90-2 having negative dispersion $D_2$. The fibers are singlemode and are suitable for the transmission of optical signals in the 1550 nm region. At this wavelength, the positive-dispersion fibers have a chromatic dispersion of about +2.3 ps/nm.km, and the negative-dispersion fibers have a chromatic dispersion of about −1.6 ps/nm.km. The dispersion-balance optical cable preferably includes an equal number of positive- and negative-dispersion fibers in the same cable. Various cable configurations 60, 80, 90 can be used including: a ribbon 60 which comprises a planar array of optical fibers bound together by a matrix material 65; groups of positive- and negative-dispersion fibers enclosed within a plastic tube 81; or other known configurations. An improved WDM system 100 interconnects two dispersion-balanced cables 90-90, and a crossover connection 105 is made between the positive-dispersion fibers 90-1 of one cable 90 and the negative-dispersion fibers 90-2 of the other cable 90.

23 Claims, 5 Drawing Sheets

(PRIOR ART)

FIG 3

(PRIOR ART)

DISPERSION-BALANCED OPTICAL CABLE

TECHNICAL FIELD

This invention relates to the field of information transmission using optical fibers, and more particularly to the design of an optical cable.

BACKGROUND OF THE INVENTION

The growth in optical communications has been fueled by the extraordinary bandwidth which is available on optical fiber. Such bandwidth enables thousands of telephone conversations and television chapels to be transmitted simultaneously over a hair-thin fiber that is generally made from a high-quality glass material. Light travels primarily within the core region of the fiber because the core has a slightly higher index of refraction than the surrounding region. And while optical transmission has significant advantages vis a vis metallic wire lines, optical fibers do have loss and do not have infinite bandwidth.

Insofar as loss is concerned, staggering advances have been made in the quality of the glass material (nearly pure silica—$SiO_2$) used in making optical fibers. In 1970, an acceptable loss for glass fiber was in the range of 20 dB/km; whereas today, losses in the range 0.22–0.25 dB/km are routine. Indeed, the theoretical minimum loss for glass fiber is about 0.16 dB/km, and it occurs at a wavelength of about 1550 nanometers (nm).

Various mechanisms limit a fiber's bandwidth. In multimode fiber, for example, there is modal dispersion in which pulses of light that enter one end of the fiber are spread as they emerge from the other end of the fiber. This is because multimode fiber supports hundreds of different modes (paths) of a particular wavelength. And when the different modes are combined at the other end of the fiber, the net result is pulse spreading. However, a fiber can be designed to support only the fundamental mode of a particular wavelength and is referred to as a singlemode fiber. Such a fiber has an extremely high bandwidth. But even here, a pulse of light that is introduced into one end of a singlemode fiber is somewhat spread as it emerges from the other end. This is because the act of turning a light source of a single wavelength on and off (i.e., a light pulse) generates a large number of harmonically related wavelengths, and different wavelengths travel through glass at different speeds. Accordingly, light pulses that are injected into one end of a glass fiber spread out as they arrive at the other end because the different wavelengths (colors) arrive at different times. Not surprisingly, this is referred to as chromatic dispersion, and is the optical counterpart to that which electrical engineers call delay distortion.

Figure 1:
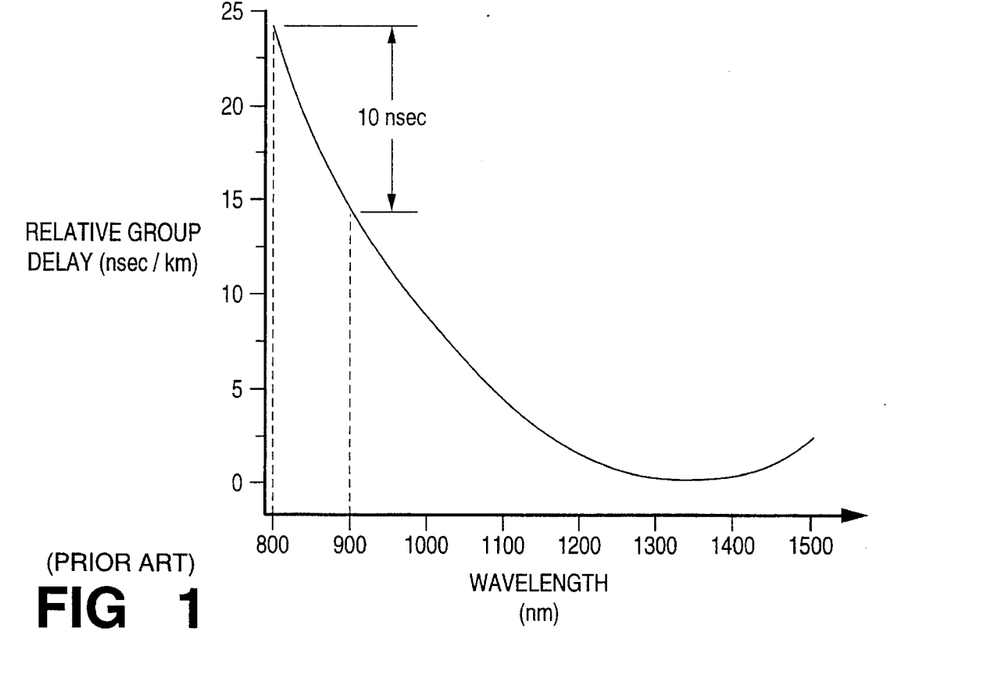
FIG. 1 is a graph that illustrates relative group delay, as a function of wavelength, for one kilometer of typical glass fiber.
Figure 2:
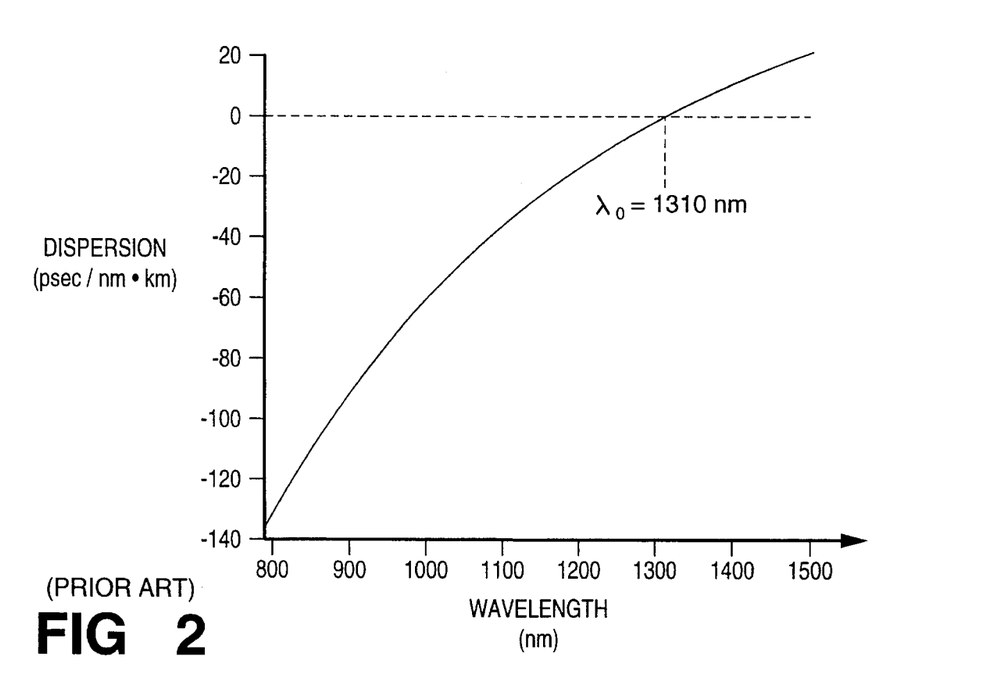
FIG. 2 is a graph that illustrates chromatic dispersion, as a function of wavelength, for the fiber shown in FIG. 1.

As shown in FIG. 1, a light pulse having an 800 nm wavelength arrives about 10 nanoseconds after one having a 900 nm wavelength in a typical glass fiber. A common way of expressing the chromatic-dispersion properties of a fiber is to take the derivative of the delay curve in FIG. 1 with respect to wavelength. This derivative is merely the slope of the delay curve as a function of wavelength and is referred to as chromatic dispersion (D), which is graphically shown in FIG. 2. The composition of glass that is generally used in making optical fiber has zero dispersion at a wavelength $\lambda_0$ in the region of 1310 nm. But, as noted above, the theoretical minimum loss for a glass fiber is in the region of 1550 nm. Interestingly, nature appears to smile benignly upon optical transmission in this wavelength region since it is where the only practical fiber amplifier operates. (Erbium-doped fiber is used to amplify optical signals having wavelengths in the 1530–1565 nm region where there is a transition in the $Er^{3+}$ dopant ion.)

It has been learned that a singlemode fiber can be designed to have its zero dispersion wavelength $\lambda_0$ anywhere generally in the 1300–1700 nm region by proper control of dopant, doping concentration, core diameter, and refractive-index profile. Because of the desirability of operating in the 1550 nm region, singlemode fibers have been designed having a zero dispersion wavelength $\lambda_0$ at about 1550 nm. Such fibers have become exceedingly popular and are generally referred to as dispersion shifted fibers (DSF).

Data transmission rates over an optical fiber can be increased via Wave Division Multiplexing (WDM) in which several channels are multiplexed onto a single fiber—each channel operating at a different wavelength. Using already-installed, non-shifted fiber, it has been demonstrated that by transmitting four channels in the 1550 nm region, the channels being separated by about 1.6 nm, capacity may be increased four-fold over single channel operation to 4×2.5 Gb/s=10 Gb/s (1 Gb/s=1 billion bits per second). However, it has been found that 4-channel WDM operation is essentially precluded by the use of DSF, and so DSF which is already in place is found to be limited either to single channel operation or to WDM systems which have limited span lengths, fewer channels, or lower bit rates per channel.

U.S. Pat. No. 5,327,516 (the '516 patent) discloses an improved optical fiber, designated WDM fiber, which is particularly effective for the transmission of multiple channels of information—each operating at a different wavelength. Such fiber is commercially available from Lucent Technologies Inc. as its TrueWave® optical fiber, and is capable of supporting at least eight channels separated from one another by 0.8 nm over span lengths greater than 360 km without regenerators. And Lucent's 1450D Dense Wave Division Multiplexer (DWDM) enables eight channels, each carrying 2.5 Gb/s of information, to be routed to/from the TrueWave optical fiber. At that rate, a system is able to transmit the equivalent of almost 5,000 novels in one second—about eight times as much as most long-distance fiber-optic systems. Indeed, by increasing the data rate of the individual channels to 20 Gb/s, increasing the number of channels to 25, and transmitting at two different polarizations, the transmission of one terabit per second (1 Tb/s= 1000 Gb/s) has already been demonstrated over 55 kilometers of TrueWave optical fiber. Heretofore, such a speed has been reverently referred to as the "Holy Grail" of data transmission.

Briefly, the '516 patent reduces non-linear interaction between channels by introducing a small but critical amount of positive or negative chromatic dispersion at 1550 nm. Such non-linear interaction is known as four-photon mixing, and it severely restricts system design as well as operating characteristics. And while the use of WDM fiber is highly desirable, a dilemma is created. Whereas the introduction of dispersion is desirable for the purpose of minimizing four-photon mixing, it is undesirable because it causes pulse spreading as discussed above.

A number of patents have already dealt with the problem of compensating dispersion including U.S. Pat. No. 4,261, 639 (Kogelnik et al.); U.S. Pat. No. 4,969,710 (Tick et al.); U.S. Pat. No. 5,191,631 (Rosenberg); and U.S. Pat. No. 5,430,822 (Shigematsu et al.). These patents compensate dispersion by inserting modules at appropriate intervals. The modules usually contain Dispersion-Compensating Fiber (DCF) of an appropriate length to produce a dispersion of approximate equal magnitude (but opposite sign) to that of the transmission fiber in the route. Unfortunately, these modules consume space, introduce extraneous loss, and increase cost.

Proposals have previously been made to construct cables in which all fibers in the cable are of one type—either positive or negative dispersion. Cables containing fibers of one type would be spliced at appropriate intervals to cables containing fibers of the other type. This approach has the disadvantage of requiring that two types of cables be manufactured and stored in inventory. Additionally, major problems arise with the administration of both types of cables during construction, keeping accurate records of where each type of cable is used and stored, and performing routine maintenance.

What is needed, and what the prior art appears to be lacking, is an optical cable which jointly enables the reduction of four-photon mixing and cumulative dispersion without the use of DCF modules.

SUMMARY OF THE INVENTION

A dispersion-balanced optical cable is disclosed that reduces four-photon mixing in Wave Division Multiplexing (WDM) systems and is effective to reduce cumulative dispersion substantially to zero. The dispersion-balanced optical cable includes optical fibers having positive chromatic dispersion—the average of the absolute magnitudes of the dispersions of the positive dispersion fibers exceeds 0.8 ps/nm.km at $\lambda_s$. The cable further includes optical fibers having negative chromatic dispersion—the average of the absolute magnitudes of the dispersions of the negative dispersion fibers exceeds 0.8 ps/nm.km at $\lambda_s$.

In an illustrative embodiment of the invention, the fibers are singlemode and are suitable for the transmission of optical signals in the 1550 nm region. At this wavelength, the positive-dispersion fibers have a chromatic dispersion of about +2.3 ps/nm.km, and the negative-dispersion fibers have a chromatic dispersion of about −1.6 ps/nm.km; although improved performance is achieved when the magnitude of the average chromatic dispersion at 1550 nm is in the range 0.8–4.6 ps/nm.km.

Various cable configurations are disclosed in illustrative embodiments of the invention which preferably include an equal number of positive- and negative-dispersion fibers in the same cable. Moreover, various cable configurations are possible including a planar array of optical fibers bound together by a matrix material, groups of fibers enclosed within a plastic tube, etc. An improved WDM system is disclosed which interconnects two dispersion-balanced cables so that the positive-dispersion fibers of one cable are connected to the negative-dispersion fibers of the other cable—thereby jointly reducing cumulative dispersion and four-photon mixing.

BRIEF DESCRIPTION OF THE DRAWING

The invention and its mode of operation will be more clearly understood from the following detailed description when read with the appended drawing in which.

DETAILED DESCRIPTION

In the manufacture of optical fiber, a glass preform rod is suspended vertically and moved into a furnace at a controlled rate. The preform softens in the furnace and a glass fiber is drawn freely from the molten end of the preform rod by a capstan located at the base of a draw tower. Because the surface of the glass fiber is susceptible to damage caused by abrasion, it is necessary to coat the fiber after it is drawn but before it comes into contact with any surface. Inasmuch as the application of a coating material must not damage the glass surface, the coating material is applied in a liquid state. Once applied, the coating material must solidify before the glass fiber reaches the capstan. This is typically accomplished within a brief time interval by photocuring—a process in which the liquid coating material is converted to a solid by exposure to electromagnetic radiation.

Figure 3:
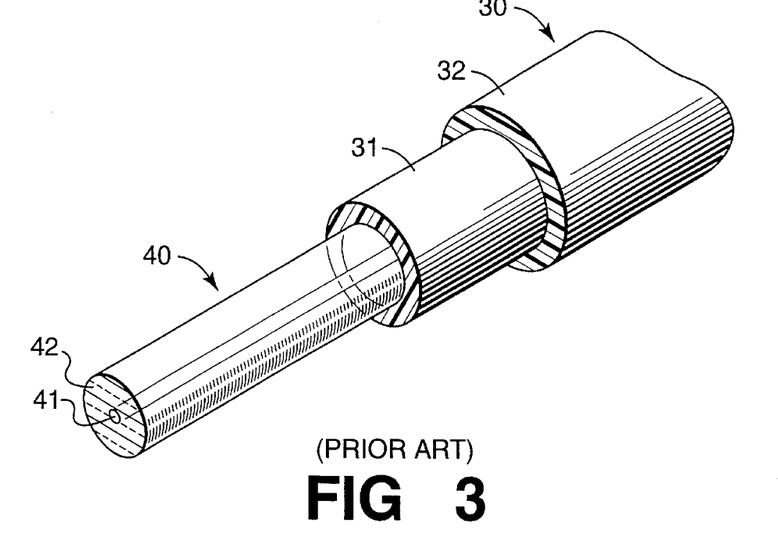
FIG. 3 is a perspective view of a known optical fiber having a dual protective coating.

More specifically, FIG. 3 discloses a dual-coated optical fiber 30, whose structure is suitable for use in the present invention. As shown, two layers of coating materials are applied to the drawn glass fiber 40, which comprises a light-carrying core 41 and a cladding 42. Clad fiber 40 has a diameter of about 125 μm. An inner layer 31, referred to as a primary coating material, is applied to the glass fiber 40; and an outer layer 32, referred to as a secondary coating material, is applied to the primary coating material 31. The secondary coating material generally has a relatively high modulus (e.g., $10^9$ Pa) to withstand handling, whereas the primary coating material has a relatively low modulus (e.g., $10^6$ Pa) to provide a cushion that reduces microbending losses. The secondary material may be applied while the primary coating is still wet, and then both coatings are simultaneously cured by radiation in the ultraviolet region of the electromagnetic spectrum.

Figure 4:
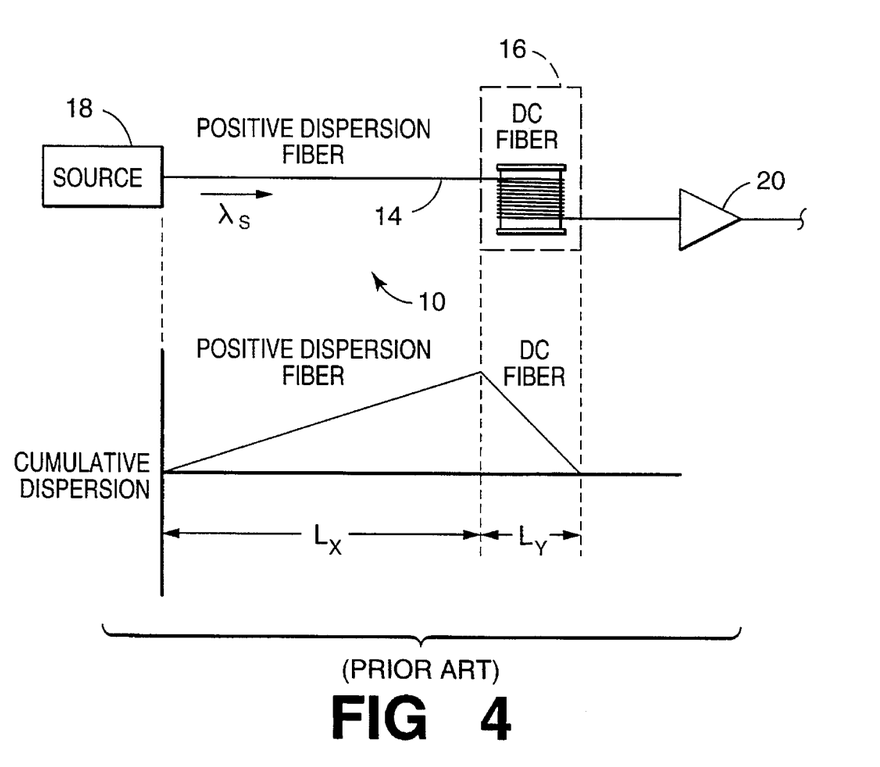
FIG. 4 illustrates the use of dispersion-compensating fiber (DCF) to cancel dispersion according to a known technique.

FIG. 4 discloses a prior art optical fiber system 10, which includes a span of 0hybrid optical fiber, an optical source 18, and an amplifier 20. The hybrid optical fiber is constructed by splicing a first predetermined length $L_x$ of a first optical fiber 14 to a second predetermined length $L_y$ of a second optical fiber 16. Splicing is performed by conventional methods known to persons skilled in the art and are described by Stephen C. Mettler et al. in "Optical Fiber Splicing," *Optical Fiber Telecommunications* II, (Stewart E. Miller et al. editors, 1988), pp. 263–300. Source 18 launches light, at a nominal wavelength $\lambda_s$, into a transmission fiber 14 having positive dispersion. However, after traveling distance $L_x$, an amount of positive dispersion has accumulated and a module 16 of optical fiber is introduced that has negative dispersion at $\lambda_s$. This module typically comprises a length $L_y$ of dispersion-compensating fiber (DCF) that is shorter than $L_x$. By adding a length of DCF, additional loss is introduced which, together with the loss introduced by transmission fiber 14, must be dealt with by amplifier 20. The need for such a system has largely been driven by the desire to upgrade existing optical networks, which presently operate at 1310 nm, to operate at 1550 nm in order to increase their capacity. (It is noted that transmission fiber which normally operates at 1310 nm has about+17 ps/nm.km of dispersion at 1550 nm, and so it is necessary to introduce an equal but opposite amount of dispersion at 1550 nm to achieve compensation.) Such a system is shown in U.S. Pat. No. 5,191,631.

It has recently been learned that in the transmission of WDM signals over optical fibers, a little bit of chromatic dispersion is a good thing in order to reduce four-photon mixing. Accordingly, the present invention contemplates operation at a nominal source wavelength $\lambda_s$ where the average of the absolute magnitudes of the dispersions $D_1$ of the positive dispersion fibers exceed 0.8 ps/nm.km, and the average of the absolute magnitudes of the dispersions $D_2$ of the negative dispersion fibers also exceed 0.8 ps/nm.km.

Figure 5:
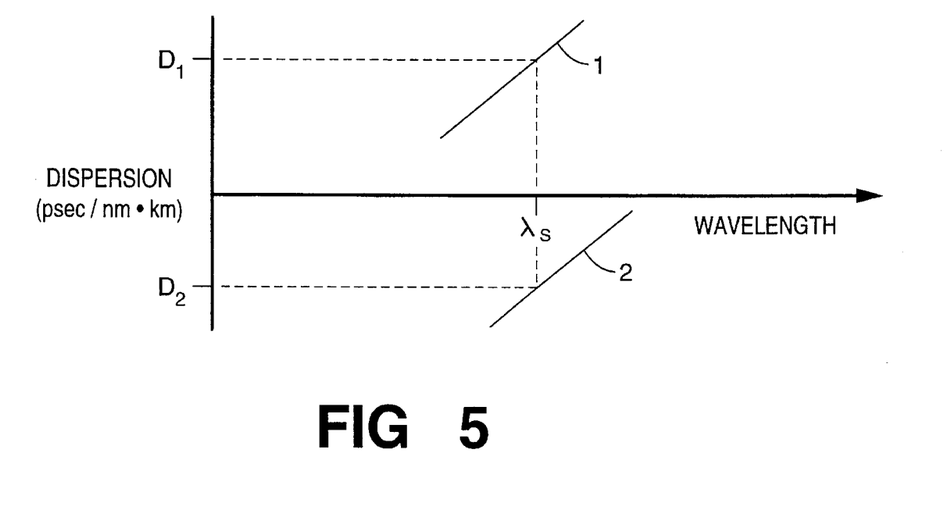
FIG. 5 is a graph that illustrates chromatic dispersion, as a function of wavelength, for two different fibers—one having positive dispersion at the source wavelength $\lambda_s$ and the other having negative dispersion at $\lambda_s$.

As shown in FIG. 5, fiber 1 has positive dispersion $D_1$ at $\lambda_s$ and fiber 2 has negative dispersion $D_2$ at $\lambda_s$. And while $D_1$ and $D_2$ are each shown having a positive slope in FIG. 5, it would be better if they had opposite slopes so that dispersion could be canceled across the band. And it would be best if the slopes of fiber 1 and fiber 2 were each equal to zero. Indeed, fibers known as "dispersion-flattened fibers" have been designed to have a slope that approaches zero over the wavelength band 1300–1550 nm which appear to be ideally suited for use in the present invention. Example of such dispersion-flattened fibers are shown in an article by Bhagavatula et al. "Segmented-core Single-mode Fibres with Low Loss and Low Dispersion,"*Electronics Letters*, 28th Apr. 1983, Vol. 19 No. 9 at pages 317–318 which is hereby incorporated by reference. In this article, dispersion-flattened fibers having positive and negative dispersion are shown. In order to select them for use in the dispersion-balanced optical cable of the present invention, at least one fiber must have a positive dispersion whose average absolute magnitude exceeds 0.8 ps/nm.km at $\lambda_s$; and at least one fiber must have a negative dispersion whose average absolute magnitude exceeds 0.8 ps/nm.km at $\lambda_s$.

Owing to non-linear effects such as self-phase modulation, it has been determined that overall performance can be optimized by using a lesser magnitude of negative dispersion. And while further optimization is possible, the preferred magnitude of negative dispersion is in the range 65–80% of the magnitude of the positive dispersion. In the preferred embodiment of the invention, $D_1$ is about +2.3 ps/nm km and $D_2$ is about −1.6 ps/nm.km.

In the present invention, singlemode fibers having a core diameter of about 6–8 µm are used, and $\lambda_s$ resides in the range 1530 nm–1565 nm. A suitable core design for supporting at least four channels of WDM is disclosed in U.S. Pat. No. 5,327,516 which is hereby incorporated by reference.

An illustrative WDM fiber yielding a dispersion of about +2.3 ps/nm.km at 1550 nm has a germania-doped core within a glass cladding whose index is near or equal to that of undoped silica. Prevalent practice makes use of a stepped-index clad, with a "pedestal" of slightly increased index to enlarge the mode field. The structure has a graded index core attaining a doping level of 7.7 mmol % corresponding with a Δ value of about 0.8%. The base of the core has a diameter of about 6.0 µm as centered on an 18 µm diameter pedestal which is germania doped to a level of about 0.05 mol %. The outside diameter of the clad fiber is about 125 µm.

An illustrative WDM fiber, yielding a dispersion of about −1.6 ps/nm.km at 1550 nm, has a germania doped core within a glass cladding whose index is near or equal to that of undoped silica. The structure has a graded index core attaining a doping level of 8.6 mol % corresponding with a Δ value of about 0.9%. The base of the core has a diameter of about 5.6 µm as centered on a 19 µm diameter pedestal which is germania doped to a level of about 0.05 mol %. The outside diameter of the clad fiber is about 125 µm.

A specification table for WDM fibers suitable for use in the present invention has been developed. However, it is not intended to define the entire range of acceptable fibers and is presented for illustrative purposes only.

| | |
|---|---|
| Attenuation at 1550 nm | 0.22–0.25 dB/km |
| Attenuation at 1310 nm | <0.50 dB/km |
| Mode field diameter at 1550 nm | 8.4 ± 0.6 microns |
| Core eccentricity | <0.8 microns |
| Cladding diameter | 125 ± 1.0 micron |
| Cutoff wavelength | <1450 nm (2 m reference length) |
| Dispersion | ±[0.8–4.6] ps/nm · km over the range 1540–1560 nm |
| Dispersion slope | <0.095 ps/nm² · km (maximum) |
| Macrobending | <0.5 dB at 1550 nm (1 turn, 32 mm) <0.05 dB at 1550 nm (100 turns, 75 mm) |
| Coating diameter | 245 ± 10 microns |
| Proof test | 100 kpsi |

Figure 6:
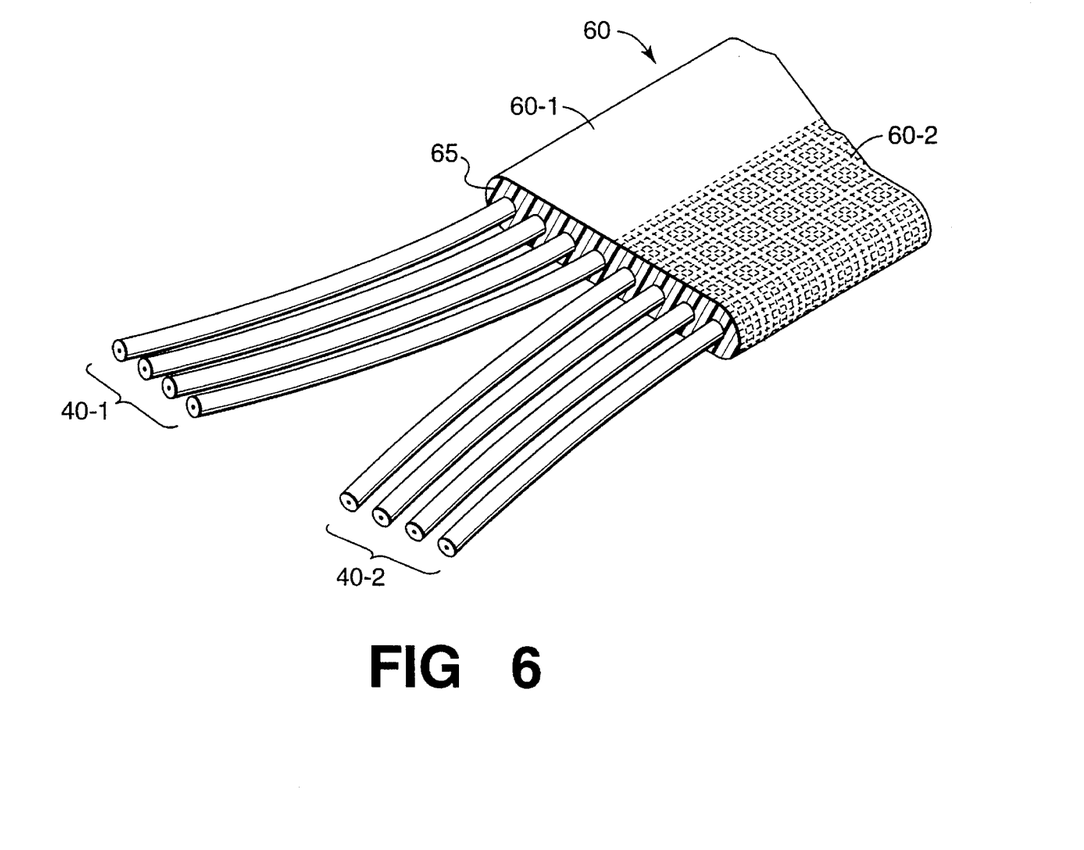
FIG. 6 is a perspective view of one form of a dispersion-balanced cable, known as a ribbon, containing fibers in a linear array having positive and negative dispersion.

Detailed descriptions of suitable procedures for fabrication are readily available. Preforms may be monolithic or composite. Core regions are preferably formed by Modified Chemical Vapor Deposition or by one of the processes using soot chemistry—Outside Vapor Deposition or Vapor Axial Deposition. Known procedures (e.g., for cladding, overcladding, coating, cabling, etc.) are unaffected by the fiber design. For example, U.S. Pat. No. 4,900,126 to Jackson et al. discloses matrix materials for bonding optical fibers into an array which is referred to as a ribbon cable (hereinafter "ribbon"). As shown in FIG. 6, ribbon 60 comprises a planar array of longitudinally extending optical fibers whose longitudinal axes are substantially parallel to one another. Here, eight optical fibers are shown divided into two groups. Illustratively, group 40-1 comprises four optical fibers having positive dispersion at $\lambda_s$, and group 40-2 comprises four optical fibers having negative dispersion at $\lambda_s$. For ease of identification in the field, each individual optical fiber has a different color. Moreover, the ribbon 60 may include a marking to identify which fibers have positive dispersion and which have negative dispersion. Illustratively, light-colored portion 60-1 of ribbon 60 contains positive-dispersion fibers whereas dark-colored portion 60-2 of ribbon 60 contains negative-dispersion fibers. Although it is not necessary in the practice of the invention to have equal numbers of positive and negative dispersion optical fibers within the same cable, it is preferable. Moreover, by manufacturing ribbons that have equal numbers of positive- and negative-dispersion fibers, only one type of ribbon needs to be manufactured.

In the preferred embodiment of the invention, ribbon 60 comprises a parallel coplanar array of longitudinally extending optical fibers. Each optical fiber is enclosed in inner and outer layers of coating materials (as illustrated in FIG. 3) and is provided with a color identifier. A matrix bonding material 65 fills the interstices between the optical fibers and bonds them together into a single unit. Bonding material 65 has a modulus y whose value is less than that of the outer coating layer on the fiber and more than the inner coating layer (i.e., $10^9$ Pa$>\gamma>10^6$ Pa ). This allows a degree of inter-fiber movement which is advantageous. Suitable bonding materials are disclosed in U.S. Pat. No. 4,900,126 which is hereby incorporated by reference.

Figure 7:
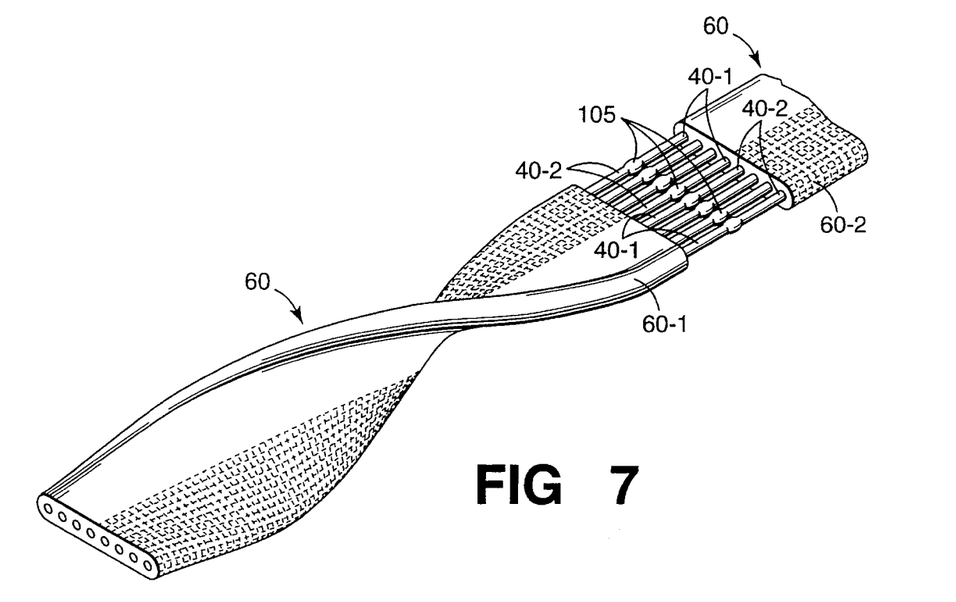
FIG. 7 shows an interconnection between ribbons of the kind shown in FIG. 6 to achieve minimum cumulative dispersion.

Reducing cumulative dispersion amounts to connecting fibers 40-1 which have positive dispersion to fibers 40-2 which have negative dispersion. Such a connection is hereinafter referred to as a crossover as illustrated in FIG. 7, and is facilitated by the use of ribbon 60. Indeed, by connecting the light-colored portion 60-1 of one ribbon 60 to the dark-colored portion 60-2 of another ribbon 60, cumulative dispersion can be reduced. And if such a crossover is made at the mid-point of a span of cable, cumulative dispersion can be reduced substantially to zero, provided that the positive dispersion provided by fibers 40-1 is substantially equal to the negative dispersion provided by fibers 40-2. A crossover connection 105 between the optical fibers may be accomplished by any known fiber interconnection technique including, but not limited to, those described in the above-mentioned article by Stephen C. Mettler et al. entitled "Optical Fiber Splicing."

Figure 8:
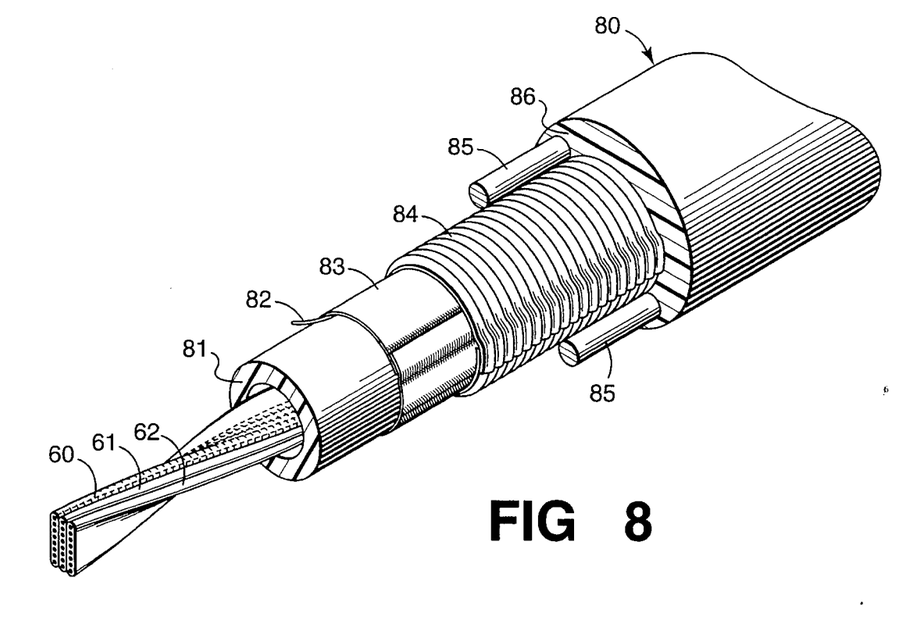
FIG. 8 is a perspective view of another form of a dispersion-balanced cable containing various types of ribbons.

Reference is now made to FIG. 8 which discloses a plurality of ribbons within a rugged optical cable structure 80. In this drawing, ribbon 60 comprises a planar array of optical fibers that includes both positive- and negative-dispersion fibers. On the other hand, ribbon 61 comprises a planar array of positive-dispersions fibers while ribbon 62 comprises a planar array of negative-dispersion fibers. Cable 80 may include various combinations of ribbons 60, 61, 62 within the present invention. For example, it may contain one ribbon 61 and one ribbon 62 but no ribbon 60. What is important is that the cable contains at least one positive-dispersion fiber and at least one negative-dispersion fiber.

Figure 9:
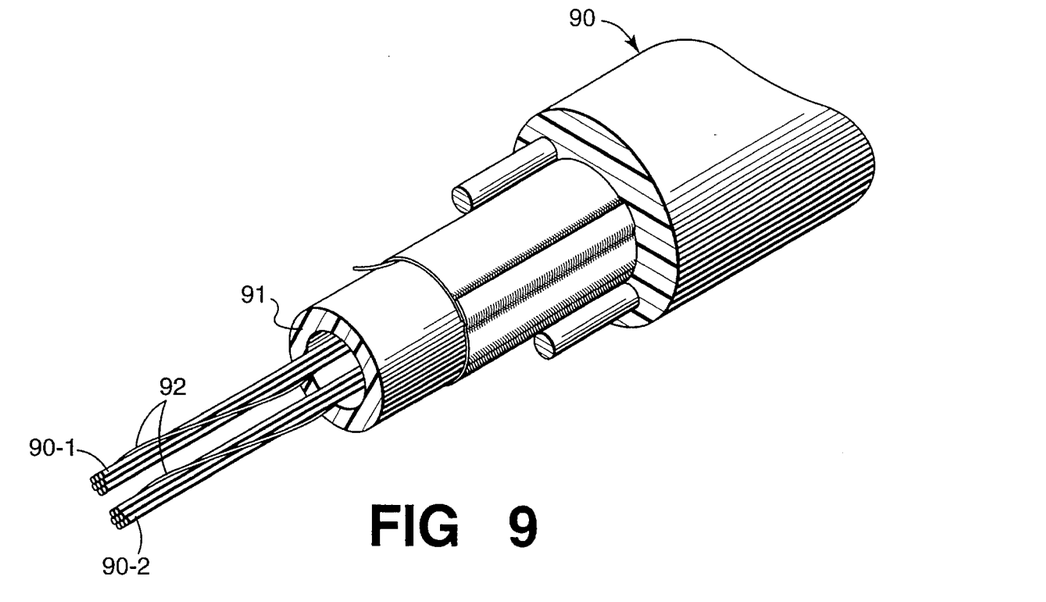
FIG. 9 discloses a perspective view of yet another form of a dispersion-balanced cable containing groups of fibers having positive and negative dispersion.

FIG. 8 provides greater detail regarding the construction of a practical cable according to the present invention. Optical cable 80 includes ribbons 60–62 as discussed above. These ribbons are disposed within a tubular member 81 which is made from a dielectric material such as polyvinyl chloride or polyethylene, for example. Surrounding tubular member 81 is a water-absorbing tape 83, a corrugated metallic shield 84, and plastic jacket 86. A rip cord 82, made of Kevlar® plastic, facilitates sheath removal, and jacket 86 of polyethylene material, for example, encloses strength members 85–85. Strength members are used to eliminate or reduce stresses that might otherwise be applied to the optical fibers during handling or normal service, and may be included within the cable 80 in any number of known ways. This same general construction is shown in FIG. 9 wherein cable structure 90 includes optical fibers that are assembled together in a different manner. For example, a bundle of optical fibers is loosely wrapped with a yarn binder 92 to form an identifiable unit 90-1. This bundle preferably comprises positive-dispersion fibers. Moreover a second bundle optical fibers is also wrapped with yarn binder 92 to form an identifiable unit 90-2. This second bundle preferably comprises negative-dispersion fibers. And while it is preferable to segregate positive-and negative-dispersion fibers into separate groups or units, it is not necessary in the practice of the invention.

Typically, a filling material is disposed within the tubular members 81, 91 shown in FIG. 8 and 9 that serves to cushion the fibers contained therein, thereby protecting against microbending loss. Greater detail regarding the construction of cables 80, 90 and suitable filling materials are disclosed in U.S. Pat. No. 4,844,575 which is hereby incorporated by reference.

Figure 10:
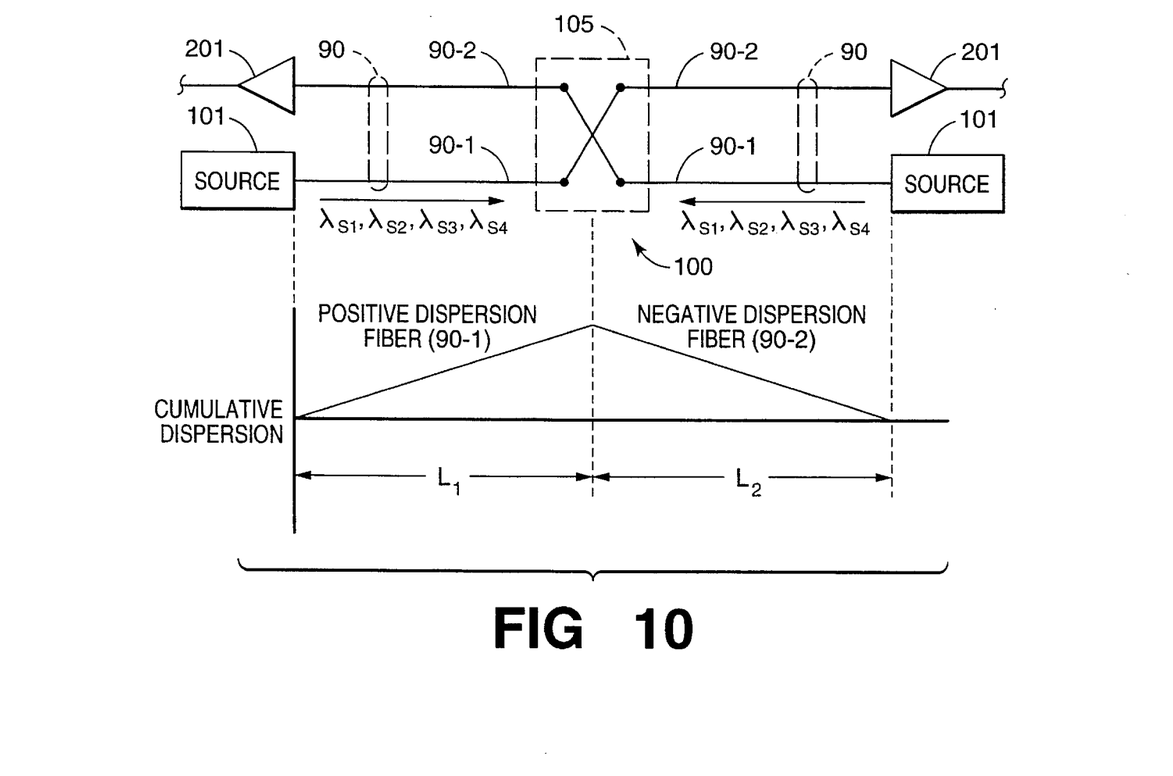
FIG. 10 illustrates the use of a dispersion-balanced cable whose cumulative dispersion approaches zero without the need for DCF modules.

The advantages of the present invention are clearly illustrated in a WDM system 100 which is shown in FIG. 10. It should be contrasted with the prior art technique for compensating dispersion disclosed in FIG. 4. In particular, prior art systems generally connect a module of DCF at the end of a transmission fiber. Because the module of DCF is typically a spool of fiber whose actual length (e.g., 3 kilometers) increases the overall span length by that amount, there is increased signal loss which means that additional amplification is required, hence increased expense. Moreover, DCF exhibits higher loss (e.g., 0.5 dB/km) than transmission fiber thereby further increasing overall system loss. However, by constructing a cable 90 with both positive-dispersion fibers 90-1 and negative-dispersion fibers 90-2, and by making crossover connections 105 at predetermined locations, typically at mid-span points, cumulative dispersion can be made to approach zero as illustrated at the bottom of FIG. 10. Importantly, this approach avoids transmission at the zero dispersion wavelength $\lambda_0$ of an optical fiber thereby reducing four-photon mixing.

WDM system 100 operates at 10 Gb/s in each direction and includes light source 101 which illustratively generates four lightwave channels $\lambda_{s1}$, $\lambda_{s2}$, $\lambda_{s3}$, $\lambda_{s4}$ in the 1530 nm–1565 nm range, each channel being separated by about 1.6 nm, and each channel operating at a speed of about 2.5 Gb/s. Light is launched into a positive-dispersion fiber 90-1 which extends for a length $L_1$. A crossover connection 105 is then made, preferably at mid span, to a negative-dispersion fiber 90-2 which extends for a length $L_2$. Advantageously, the same cable 90 contains both positive-and negative-dispersion fibers, so it can be severed at any convenient location and a crossover connection 105 made. Such connections are readily made within known closures similar to the one shown in U.S. Pat. No. 5,481,639. Since DCF modules are not used in this system, amplifier 201 only needs to deal with transmission losses and not the added loss provided by one or more spools of fiber.

Although various particular embodiments of the present invention have been shown and described, modifications are possible within the spirit and scope of the invention. These modifications include, but are not limited to: the use of the present invention in a system whose source wavelength ($\lambda_s$) is outside the 1530–1565 nm region; making crossover connections at locations other than mid span (i.e., $L_1 \neq L_2$); the use of dispersion-balanced cable in non-WDM systems; cables having a different number of positive-dispersion fibers than negative-dispersion fibers; cables having fibers with different magnitudes of positive and negative dispersion at the source wavelength; cables having one or more types of fibers in addition to the positive and negative dispersion fibers; and cables having different constructions than the ones illustrated—e.g., optical cables without tubular members or strength members.

We claim:

1. A dispersion-balanced optical cable comprising one or more optical fibers of a first type and one or more optical fibers of a second type, both types of optical fiber being suitable for transmitting optical signals at a source wavelength $\lambda_s$,

CHARACTERIZED IN THAT:

the first type of optical fiber has positive chromatic dispersion, the average of the absolute magnitudes of the dispersions of the positive dispersion fibers exceeding 0.8 ps/nm.km at $\lambda_s$; and the second type of optical fiber has negative chromatic dispersion, the average of the absolute magnitudes of the dispersions of the negative dispersion fibers exceeding 0.8 ps/nm.km at $\lambda_s$.

2. The dispersion-balanced optical cable of claim 1 wherein the source wavelength $\lambda_s$ resides in the range 1530 nm<$\lambda_s$<1565 nm.

3. The dispersion-balanced optical cable of claim 2 wherein the first and second types of optical fiber are singlemode and have:

(i) an attenuation that is less than 0.26 dB/km at 1550 nm;

(ii) a cutoff wavelength that is less than 1450 nm; and (iii) a dispersion slope that is less than 0.1 ps/(nm$^2$.km), the absolute magnitude of the average chromatic dispersion at 1550 nm being in the range 0.8–4.6 ps/nm.

4. The dispersion-balanced optical cable of claim 3 wherein the first type of optical fiber has an average chromatic dispersion $D_1$ and wherein the second type of optical fiber has an average chromatic dispersion $D_2$, the absolute magnitude of $D_2$ being 65–80% the absolute magnitude of $D_1$.

5. The dispersion-balanced optical cable of claim 3 wherein the first type of optical fiber has an average chromatic dispersion of approximately +2.3 ps/nm.km at 1550 nm.

6. The dispersion-balanced optical cable of claim 3 wherein the second type of optical fiber has an average negative chromatic dispersion of approximately −1.6 ps/nm.km at 1550 nm.

7. The dispersion-balanced optical cable of claim 1 wherein the cable further comprises:

a plastic tubular member that encloses the optical fibers of the first and second types;

a plastic jacket that encloses the tubular member; and one or more strength members disposed within the cable.

8. The dispersion-balanced optical cable of claim 1 wherein the first and second types of optical fibers are bonded together in a planar array, said optical fibers having longitudinal axes that are substantially parallel to one another.

9. The dispersion-balanced optical cable of claim 8 wherein the optical fibers of the first type and the optical fibers of the second type are equal in number to each other.

10. The dispersion-balanced optical cable of claim 8 wherein the cable further comprises:

a plastic tubular member that encloses the planar array;

a plastic jacket that encloses the tubular member; and one or more strength members disposed within the cable.

11. The dispersion-balanced optical cable of claim 1 wherein the first type of optical fibers are bonded together in a first planar array and the second type of optical fibers are bonded together in a second planar array, each planar array comprising optical fibers having longitudinal axes that are substantially parallel to one another.

12. The dispersion-balanced optical cable of claim 11 wherein the cable further comprises:

a plastic tubular member that encloses the first and second planar arrays;

a plastic jacket that encloses the tubular member; and one or more strength members disposed within the cable.

13. The optical cable of claim 1 wherein optical fibers of the first type are assembled together into a first unit and wrapped with a binder, and wherein optical fibers of the second type are assembled together into a second unit and wrapped with a binder.

14. The dispersion-balanced optical cable of claim 13 wherein the cable further comprises:

a plastic tubular member that encloses the first and second units;

a plastic jacket that encloses the tubular member; and one or more strength members disposed within the cable.

15. A wave division multiplexed system comprising:

a source of optical signals having a nominal wavelength $\lambda_s$;

first and second dispersion-balanced cables having predetermined lengths $L_1$, $L_2$ respectively, each cable including optical fibers having positive chromatic dispersion $D_1$—the average of the absolute magnitudes of $D_1$ being greater than 0.8 ps/nm.km at $\lambda_s$, and each cable including optical fibers having negative chromatic dispersion $D_2$—the average of the absolute magnitudes of $D_2$ being greater than 0.8 ps/nm.km at $\lambda_s$.

means interconnecting an optical fiber having positive chromatic dispersion within the first cable to an optical fiber having negative chromatic dispersion within the second cable.

16. The wave division multiplexed system of claim 15 wherein $\lambda_s$ resides in the wavelength range 1530 nm–1565 nm.

17. The wave division multiplexed system of claim 15 wherein the absolute magnitude of each of $D_1$ and $D_2$ resides in the range 0.8–4.6 ps/nm.km at $\lambda_s$.

18. The wave division multiplexed system of claim 17 wherein the absolute magnitude of $D_2$ is about 65–80% of the absolute magnitude of $D_1$.

19. The wave division multiplexed system of claim 18 wherein $D_1$ is approximately equal to +2.3 ps/nm.km at $\lambda_s$, and $D_2$ is approximately equal to −1.6 ps/nm.km at $\lambda_s$.

20. The wave division multiplexed system of claim 15 wherein $L_1$ is approximately equal to $L_2$.

21. An optical cable including a plurality of glass fibers, some of the glass fibers having positive chromatic dispersions $D_1$ at a predetermined wavelength and others of the glass fibers having negative chromatic dispersions $D_2$ at the predetermined wavelength, the average of the absolute magnitudes of $D_1$ being greater than 0.8 ps/nm.km at the predetermined wavelength, and the average of the absolute magnitudes of the dispersions $D_2$ exceeding 0.8 ps/nm.km at the predetermined wavelength.

22. The optical cable of claim 21 wherein the absolute magnitudes of $D_1$ and $D_2$ are less than 4.6 ps/nm.km at the predetermined wavelength.

23. The optical cable of claim 21 wherein the predetermined wavelength resides in the range 1530 nm–1565 nm.

* * * * *